(12) United States Patent
Dees et al.

(10) Patent No.: US 8,850,439 B2
(45) Date of Patent: *Sep. 30, 2014

(54) STORAGE SUBSYSTEM DEVICE DRIVER SCHEDULING I/O SERVICING ACCORDING TO PRIORITY OF IDENTIFIED PROCESS

(75) Inventors: Brian Dees, Hillsboro, OR (US); Knut Grimsrud, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 179 days.

This patent is subject to a terminal disclaimer.

(21) Appl. No.: 12/852,171

(22) Filed: Aug. 6, 2010

(65) Prior Publication Data

US 2010/0299670 A1    Nov. 25, 2010

Related U.S. Application Data

(63) Continuation of application No. 11/241,255, filed on Sep. 30, 2005, now Pat. No. 7,774,781.

(51) Int. Cl.
*G06F 9/46* (2006.01)
*G06F 13/26* (2006.01)
*G06F 9/44* (2006.01)

(52) U.S. Cl.
CPC .................................. *G06F 9/4443* (2013.01)
USPC ......................................... 718/103; 711/151

(58) Field of Classification Search
USPC .......................................... 718/103; 711/151
See application file for complete search history.

(56) References Cited

U.S. PATENT DOCUMENTS

| | | | |
|---|---|---|---|
| 5,867,160 A | 2/1999 | Kraft, IV et al. | |
| 6,084,553 A | 7/2000 | Walls et al. | |
| 6,091,414 A | 7/2000 | Kraft, IV et al. | |
| 6,834,315 B2 * | 12/2004 | Johnson | 710/6 |
| 7,409,586 B1 * | 8/2008 | Bezbaruah et al. | 714/13 |
| 7,774,781 B2 | 8/2010 | Dees et al. | |
| 7,945,914 B2 * | 5/2011 | Hasiuk et al. | 718/107 |
| 2004/0205206 A1 | 10/2004 | Naik et al. | |
| 2007/0079021 A1 | 4/2007 | Dees et al. | |

OTHER PUBLICATIONS

Kuliniewicz, Paul. "CreateToolhelp32Snapshot Function", Windows API Guide, Sep. 24, 2000.*

ProgTown.com, "GetCurrentWindow && GetForeGroundWindow API", Programmer's Town, Nov. 29, 1999.*

"U.S. Appl. No. 11/241,255, Notice of Allowance mailed Apr. 7, 2010", 9 pgs.

"U.S. Appl. No. 11/241,255, Preliminary Amendment filed Oct. 29, 2007", 7 pgs.

"U.S. Appl. No. 11/241,255, Response filed Jan. 13, 2010 to Non Final Office Action mailed Oct. 26, 2009", 11 pgs.

"U.S. Appl. No. 11/241,255, Non-Final Office Action mailed Oct. 26, 2009", 13 Pgs.

* cited by examiner

*Primary Examiner* — Mengyao Zhe
*Assistant Examiner* — Brian Chew
(74) *Attorney, Agent, or Firm* — Schwegman Lundberg & Woessner, P.A.

(57) ABSTRACT

Systems, methods, and apparatus to identify and prioritize application processes in one or more subsystems. Some embodiments identifying applications and processes associated with each application executing on a system, apply one or more priority rules to the identified applications and processes to generate priority information, and transmit the priority information to a subsystem. The subsystem then matches received requests with the priority information and services the processes according to the priority information.

12 Claims, 3 Drawing Sheets

STORAGE SUBSYSTEM DEVICE DRIVER SCHEDULING I/O SERVICING ACCORDING TO PRIORITY OF IDENTIFIED PROCESS

This application is a continuation of U.S. patent application Ser. No. 11/241,255, filed on Sep. 30, 2005, now issued as U.S. Pat. No. 7,774,781, which is incorporated herein by reference in its entirety.

TECHNICAL FIELD

The inventive subject matter relates to data processing and, more particularly, selective input/output prioritization by system process/thread and foreground window identification.

BACKGROUND INFORMATION

Faster computer processor frequencies and multi-core designs are increasing the amount computing power in computer systems. However, bottlenecks within these systems limit the full benefits of this increased processing power. One such bottleneck can arise on a system when a background task receives sufficient processor cycles to generate enough disk access to congest the disk and cause a foreground task to be slow as a result of the disk congestion. This and other bottlenecks can create visibly long delays in user response. Further, such bottlenecks can be so extreme as to cause negative performance scaling where a faster processor actually delivers a visibly slower user experience due to congestion in the storage or other subsystem.

DETAILED DESCRIPTION

Figure 1:
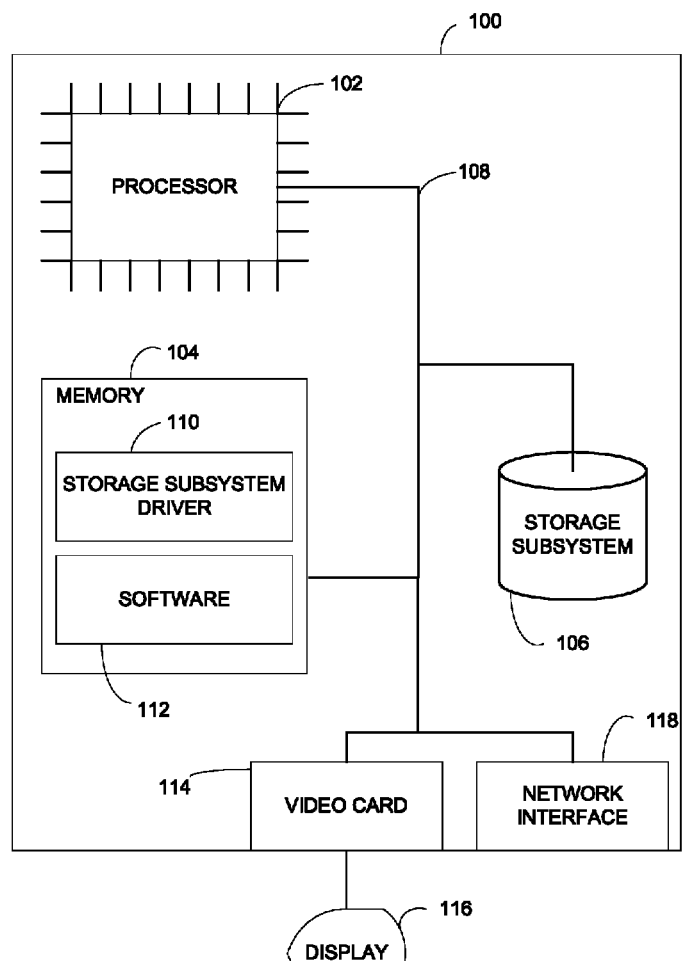
FIG. 1 is a schematic of a system according to an example embodiment.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, such functions correspond to modules, which are software, hardware, firmware, or any combination thereof. Multiple functions are performed in one or more modules as desired, and the embodiments described are merely examples. The software is executed on a processing unit such as a digital signal processor, an application specific integrated circuit, microprocessor, or other type of processor operating on a system, such as a personal computer, server, a router, or other device capable of processing data including network interconnection devices. In some embodiments, the processing unit is a dual or multi-core processing unit. In other embodiments, the processing unit includes two or more single or multi-core processing units.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

A driver for the digital home/office and multi-core processor and multiprocessor system architecture is concurrent application usage. In this architecture, it is possible for a subsystem, such as a storage subsystem, to become congested with usage requests from concurrently executing applications at the expense of net performance or responsiveness. In such architectures, it is advantageous for the subsystems creating bottlenecks to have information about the priority of subsystem usage requests. This information can be used by the subsystem to improve responsiveness by prioritizing visible foreground application process subsystem usage or the priority of another process the user or an administrator designates as having priority.

FIG. 1 is a schematic of a system 100 according to an example embodiment. The system 100 includes a processor 102, a memory 104, a storage subsystem 106, and a bus 108 that operatively interconnects the processor 102, the memory 104, and the storage subsystem 106. In some embodiments, the bus 108 interconnects other system 100 components such as a video card 114, a network interface 118, and other system 100 components depending on the particular embodiment of the system 100.

The processor 102 of the system 100 represents a digital signal processor or processing unit of any type of architecture, such as an ASIC (Application-Specific Integrated Circuit), a CISC (Complex Instruction Set Computing), RISC (Reduced Instruction Set Computing), VLIW (Very Long Instruction Word), or hybrid architecture, although any appropriate processor may be used. The processor 102 executes instructions, such as instructions included in software 112 stored in the memory 104. In some embodiments, the processor 102 also includes a control unit that organizes data and program storage in memory 104 and transfers data and other information in and out of the system 100.

In some embodiments, the processor 102 is a dual-core processor. In other embodiments, the processor 102 represents two or more processors. In some such embodiments, the two or more processors include one or more dual or multi-core processors. In yet further embodiments, the processor 102 is one single-core processor.

The memory 104 represents one or more mechanisms to store data. For example, the memory 104, in various embodiments, includes one or more of a random access memory (RAM), magnetic disk storage media, optical storage media, flash memory devices, and other volatile and non-volatile machine-readable media. In other embodiments, the memory 104 includes any appropriate type of storage or memory 104.

Although only one memory 104 is shown, multiple memories 104 of various types and multiple types can be present.

The memory 104, as illustrated in FIG. 1, holds a storage subsystem driver 110 and software 112. The storage subsystem driver 110 executes on the processor 102 to enable communication between the processor 102 and the storage subsystem 106. The storage subsystem driver 106 is able to receive application and priority information from the software 112 to prioritize application and process access to the storage subsystem.

The storage subsystem 106, in some embodiments, represents a magnetic storage media, such as a hard disk. In other embodiments, the storage subsystems represents one or more of a hard disk, an optical disk, a volatile or non-volatile memory device such as a random access media (RAM) or flash memory, a network storage device, a floppy disk drive, or other data storage or memory device.

The software 112 is operable on the processor 102 to perform various functions and methods as described herein. For example, in some embodiments, the software 112 is operable on the processor 102 to identify applications operating on the system and individual processes associated with each application. In some such embodiments, the software then applies one or more priority rules defined in the memory to determine storage subsystem 106 priority of the different processes. The priority rules are stored in the memory 104, or elsewhere on the system 100, and define which application processes, when operating concurrently on the system 100, receive priority in the storage subsystem. In one embodiment, an example priority rule defines that processes associated with a foreground application displayed to a user on a display 116 receive the highest priority. After the priority rules are applied, the priority information is communicated to the storage subsystem driver 110 which uses that information to schedule process storage subsystem 106 access. Other embodiments include prioritizing servicing of applications and processes in other system 100 subsystems.

In some embodiments, the software 112 is a background application that operates on top of a system 100 operating system. In other embodiments, the software 112 is integrated within a system 100 operating system. In yet further embodiments, the software 112 is embedded within the storage subsystem driver 110.

Figure 2:
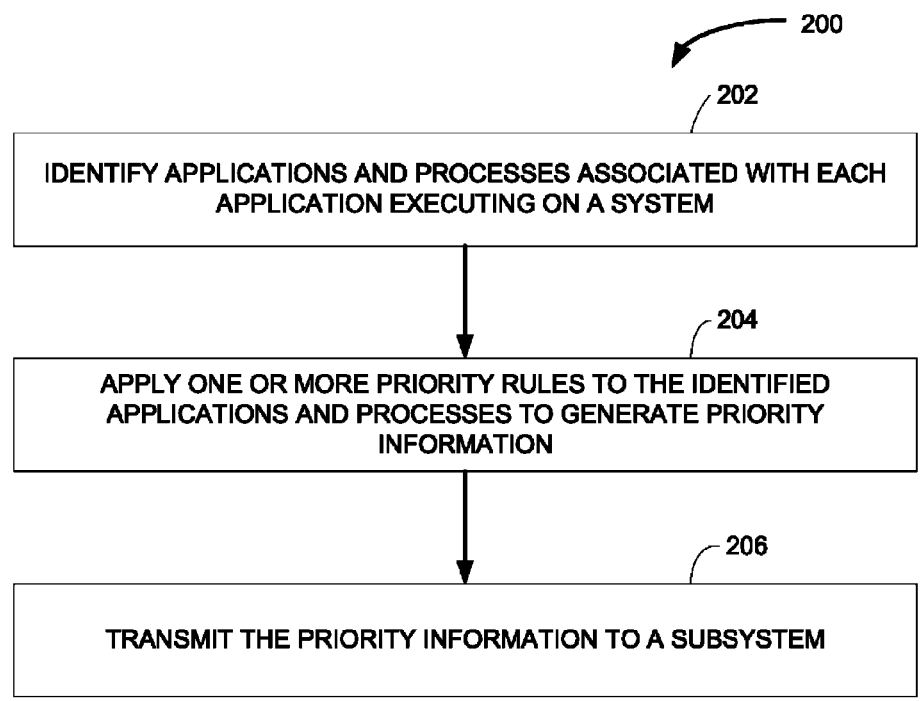
FIG. 2 is a flow diagram of a method to prioritize subsystem processing according to an embodiment of the inventive subject matter.

FIG. 2 is a flow diagram of a method 200 to prioritize subsystem processing according to an embodiment of the inventive subject matter. The method 200 includes identifying applications and processes associated with each application executing on a system 202 and applying one or more priority rules to the identified applications and processes to generate priority information 204. The priority information includes a list of one or more processes, or other tasks, designated as high or low priority. The method 200 further includes transmitting the priority information to a subsystem 206. The subsystem then maintains the priority information and determines in the subsystem an order of servicing subsystem access or usage requests. The method 200, in some embodiments, dynamically executes in an ongoing fashion. The method 200 in such embodiments, executes to identify system applications and processes on an ongoing basis to provide the priority information to the subsystem to allow the subsystem to dynamically prioritize processes.

In some embodiments, identifying applications and processes associated with each application executing on a system 202 includes making one or more operating system function calls that return an identifier of each executing application or associated associated processes. For example, in some embodiments that execute on a computer with the Microsoft® Windows® operating system, these operating system functions calls include the calls GetForegroundWindow, GetWindowThreadProcessID, CreatToolhelp32Snapshot, Thread32First, Thread32Next, Process32First, and Process32Next.

In one embodiment including a priority rule that designates processes associated with a foreground window as highest priority processes, the foreground window is identified using the GetForegroundWindow operating system call. The return from the GetForegroundWindow call is then used as an argument to make the GetWindowThreadProcessID call which returns identifiers of processes and threads associated with the foreground window. Other embodiments include using the operating system calls listed above and other calls as will be apparent to one of skill in the art to identify system processes as needed or as defined by the priority rules of specific embodiments.

In some embodiments, the priority rules are defined to give processes associated with certain applications high or low processing priority in the subsystem. For example, processes associated with a spreadsheet application can be given a high priority while processes associated with another application such as a background virus scanning application can be given a low priority. In other embodiments, the priority rules grant priority to one or more other applications as designated by a system user, a system administrator, a remote system administrative process, or one or more other processing policies in accordance with system or enterprise service level objectives or agreements. In further embodiments, the priority rules include a rule to designate processes associated with a foreground application displayed to a user as high priority processes, thus improving application response time, user productivity potential, and enhancing the user experience.

In some embodiments, transmitting the priority information to a subsystem 206 can also include transmitting information designating certain processes as lower priority processes. Thus, transmitting the priority information to a subsystem 206 can include downgrading and upgrading previously established process priority designations based on a changing system environment, such as a change in a foreground window displayed to a user.

In some embodiments, transmitting the priority information to a subsystem 206 includes transmitting a process identifier and a priority designator of one or more processes.

The subsystem, in some embodiments, is a storage subsystem such as storage subsystem 106 illustrated in FIG. 1.

Figure 3:
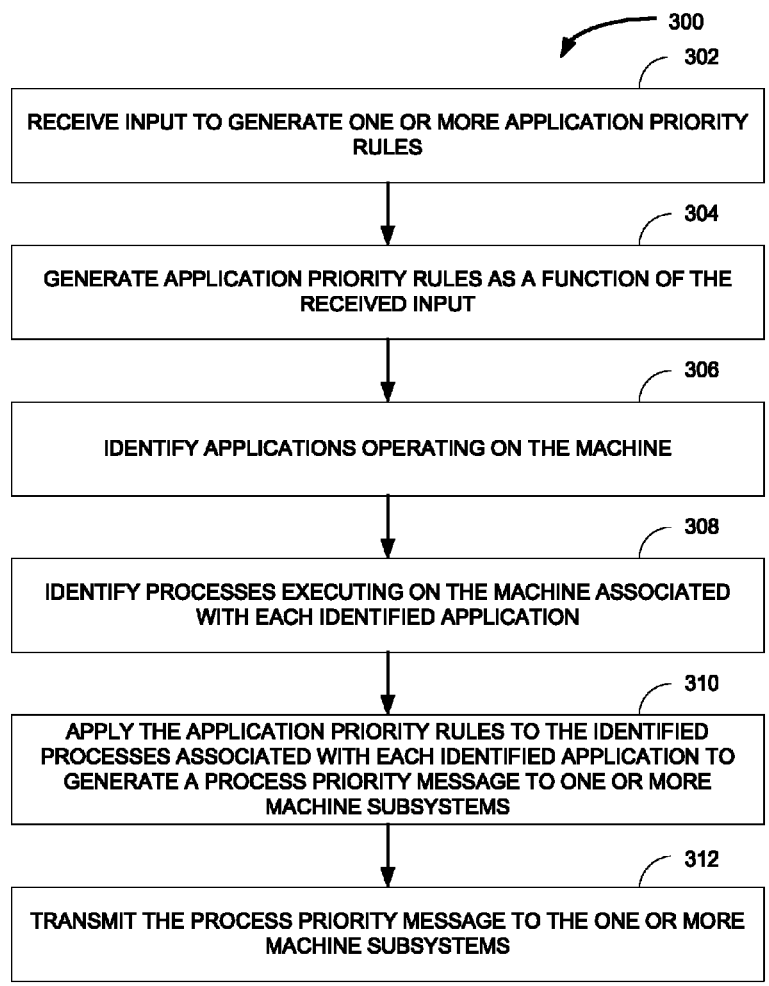
FIG. 3 is a flow diagram of another method to prioritize subsystem processing according to an embodiment of the inventive subject matter.

FIG. 3 is a flow diagram of another method 300 to prioritize subsystem processing according to an embodiment of the inventive subject matter. The method 300 executes on a machine to result in the machine receiving input to generate one or more application priority rules 302 and generating application priority rules as a function of the received input 304. The method 300 then determines how to apply the rules by identifying applications operating on the machine 306 and identifying processes executing on the machine associated with each identified application 308. The method 300 further causes the machine to apply the rules by applying the application priority rules to the identified processes associated with each identified application to generate a process priority message to one or more machine subsystems 310 and transmitting the process priority message to the one or more machine subsystems 312.

In some embodiments, the method 300 further executes on the machine to result in the machine iteratively identifying applications operating on the machine and iteratively identifying processes executing on the machine associated with each iteratively identified application. In such embodiments, the method 300 also results in the machine iteratively applying the application priority rules to the identified processes associated with each identified application to generate a process priority message to one or more machine subsystems. The method 300, in such embodiments, further results in the machine transmitting the process priority message to the one or more machine subsystems when the iterative application of the priority rules results in a process priority change.

In some embodiments, transmitting the process priority message to the one or more machine subsystems 312 includes transmitting the process priority message to a driver of each respective one or more machine subsystems. In some embodiments, transmitting the process priority message includes transmitting a message to a subsystem in a message separate from data or usage requests, such as through an sidechannel communication mechanism, such as an IOCTL input/output control message.

The process priority message, in some embodiments, is received by a subsystem driver and the priority information therein is stored in a table accessed by the subsystem driver. Processes identifiers are then used as a key into the table to determine a priority of the process. The priorities determined by the subsystem driver are then used to schedule servicing of the processes by the subsystem.

In some embodiments, the method 300 further causes the machine to provide a user interface to a user from which the input to generate the one or more application priority rules 304 is received.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

What is claimed is:

1. A method comprising:
   identifying applications and processes associated with each identified application executing on a system by calling an operating system routine;
   applying one or more priority rules to the identified applications and processes to generate priority information, at least one of the one or more priority rules including an administrator defined priority rule;
   transmitting the priority information to a storage subsystem device driver; and
   executing the storage subsystem device driver to:
     store, on the storage subsystem, the priority information in a table;
     match storage subsystem processes with a priority in the table, the storage subsystem processes being processes of the identified processes; and
     schedule storage subsystem process servicing according to the matching.

2. The method of claim 1, wherein the priority information includes information designating certain processes of the identified processes as high priority processes.

3. The method of claim 1, wherein the one or more priority rules include a rule, the applying of which, causes identified processes associated with a foreground application to be designated as high priority processes.

4. The method of claim 1, wherein the one or more priority rules include a rule, the applying of which, causes identified processes associated with a foreground application to be designated as high priority processes.

5. A non-transitory machine-readable medium, with instructions thereon which when processed, result in a machine:
   identifying applications and processes associated with each identified application executing on a system by calling an operating system routine;
   applying one or more priority rules to the identified applications and processes to generate priority information, at least one of the one or more priority rules including an administrator defined priority rule;
   transmitting the priority information to a storage subsystem driver; and
   executing instructions of the storage subsystem device driver to:
     store, on the storage subsystem, the priority information in a table;
     match storage subsystem processes with a priority in the table, the storage subsystem processes being processes of the identified processes; and
     schedule storage subsystem process servicing according to the matching.

6. The non-transitory machine-readable medium of claim 5, wherein the priority information includes information designating certain processes of the identified processes as high priority processes.

7. The non-transitory machine-readable medium of claim 5, wherein the one or more priority rules include a rule, the applying of which, causes identified processes associated with a foreground application to be designated as high priority processes.

8. The non-transitory machine-readable medium of claim 5, wherein the one or more priority rules include a rule, the applying of which, causes processes associated with an application of a certain type to be designated as high priority processes.

9. A system comprising:
   a processor;
   a memory device;
   a storage device;
   a bus operatively coupling the processor to the storage subsystem;
   instructions held in the memory device and executable by the processor to:
     identify applications and processes associated with each identified application executing on a system by calling an operating system routine;
     apply one or more priority rules to the identified applications and processes to generate priority information, at least one of the one or more priority rules including an administrator defined priority rule; and transmit the priority information to the storage device; and a storage subsystem device driver including instructions held in the memory and executable by the processor to:

store, on the storage device, the priority information in a table;

match storage device processes with a priority in the table, wherein the storage device processes are processes of the identified processes; and schedule storage device process servicing according to the matching.

10. The system of claim 9, wherein the priority information includes information designating certain processes of the identified processes as high priority processes.

11. The system of claim 9, wherein the one or more priority rules include a rule, the applying of which, causes identified processes associated with a foreground application to be designated as high priority processes.

12. The system of claim 9, wherein the one or more priority rules include a rule, the applying of which, causes processes associated with an application of a certain type to be designated as high priority processes.

* * * * *